US006668964B2

(12) United States Patent
Braud

(10) Patent No.: US 6,668,964 B2
(45) Date of Patent: *Dec. 30, 2003

(54) AUTOMOTIVE VEHICLE WITH TELESCOPIC LOAD CARRYING ARM

(75) Inventor: Marcel-Claude Braud, Champtoceaux (FR)

(73) Assignee: Manitou BF, Ancenis (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 57 days.

(21) Appl. No.: 09/247,557

(22) Filed: Feb. 10, 1999

(65) Prior Publication Data

US 2001/0014277 A1 Aug. 16, 2001

(30) Foreign Application Priority Data

Feb. 20, 1998 (FR) .............................. 98 02061

(51) Int. Cl.⁷ ................................................ B60K 1/00
(52) U.S. Cl. ....................................... 180/292; 414/680
(58) Field of Search ................................ 414/680, 685, 414/718; 180/291, 292, 293, 297, 89.2, 329, 331, 53.1, 53.2, 53.6, 53.7

(56) References Cited

U.S. PATENT DOCUMENTS

| 4,280,783 A | * | 7/1981 | Hayward ..................... 414/718 |
| 4,300,649 A | * | 11/1981 | Sakata ..................... 180/291 X |
| 4,585,084 A | * | 4/1986 | van der Lely ......... 180/53.7 X |
| 4,618,016 A | | 10/1986 | Van der Lely |
| 4,667,536 A | * | 5/1987 | Ehrlinger et al. ...... 180/53.2 X |
| 5,618,156 A | * | 4/1997 | Brown ..................... 180/292 X |
| 5,687,809 A | * | 11/1997 | Braud ..................... 180/292 X |

FOREIGN PATENT DOCUMENTS

| EP | 0 656 315 A1 | 7/1995 |
| FR | 2 650 541 | 2/1991 |

* cited by examiner

Primary Examiner—Donald W. Underwood
(74) Attorney, Agent, or Firm—Young & Thompson

(57) ABSTRACT

An automotive vehicle with a telescopic load carrying arm 30, comprises a rigid chassis 32 carried by two front and rear axles 1 and 2, a driver's cab 33 and a support 31 for articulation of a telescopic load charging arm 30 disposed in front of the cab 33. The chassis 32 has a first compartment 34 containing an internal combustion motor 21 and a radiator 23, a second compartment 35 containing two reservoirs of onboard fluid, and a securement 36 adapted to receive agricultural tractive equipment.

15 Claims, 8 Drawing Sheets

AUTOMOTIVE VEHICLE WITH TELESCOPIC LOAD CARRYING ARM

This application corresponds to French application 98 02061 of Feb. 20, 1998, the disclosure of which is incorporated herein by reference.

The invention relates to an automotive vehicle with a telescopic load carrying arm, of the type comprising a rigid chassis carried by two front and rear bridges provided with wheels and a driver's cab mounted on said rigid chassis.

The document FR 2 103 955 discloses a motor vehicle, for agricultural use, for traction, pushing and carrying tools and apparatus. This vehicle is provided with two drive axles disposed resiliently on a chassis and having tractive wheels of equal size, whose drive is ensured by an internal combustion engine with several cylinders by means of a torque converter, and provided with a power delivery device. The internal combustion motor extends transversely to the longitudinal axis of the vehicle.

Because the driver's cab of this vehicle is located partially in the region of vertical extension of the front wheels, this vehicle for agricultural use cannot receive telescopic load carrying arms in front of this cab.

There are also known handling machines for agricultural use produced and sold by the French company MANITOU BF. These engines of agricultural use comprise an articulated chassis carried by two front and rear bridges provided with wheels and a driver's cab mounted on said articulated chassis. The articulation support of the telescopic load carrying arm is disposed in front of the cab and substantially toward the middle of the distance between the front and rear axles. Because the internal combustion motor is disposed behind the cab and forms a counterweight, it is not possible to use this handling machine to fulfill the functions of an agricultural tractor.

The invention has for its object to overcome the drawbacks of the prior art, by providing a new automotive vehicle with a telescopic load carrying arm, which can be used both as a handling carriage with a telescopic arm and as an agricultural tractor, thanks to a modular construction permitting rapid modification of the rear equipment itself to a tractor whilst giving good accessibility to the motor propulsion group.

The invention has for its object a vehicle with a telescopic load carrying arm of the type comprising a rigid chassis carried by two front and rear axles provided with wheels and a driver's cab mounted on said rigid chassis, in which the articulation support of the telescopic load carrying arm is disposed in front of the cab and substantially toward the middle of the distance between the front axle and the rear axle, characterized in that the chassis carries externally and laterally, between one front wheel and one rear wheel, on one side a compartment containing an internal combustion engine, and on the other a compartment containing at least one reservoir of onboard fluid; and in that the chassis has, on the side opposite the telescopic arm, securement means adapted to receive at least one rear equipment.

According to other characteristics of the invention:

said motor is oriented transversely and connected to an angle change of which one outlet drives a gearbox oriented longitudinally and disposed substantially in a central position, below the support of the telescopic load carrying arm, the motor is connected to the gearbox by a connecting shaft, particularly by means of a grooved shaft coacting with a grooved sleeve, preferably, at least one rear equipment is selected from the group comprising: a towing unit, a hydraulic lifting assembly, a power outlet connected by a cardan shaft to said gearbox, the vehicle comprises a coupling means, particularly a towing hook, the vehicle comprises a rear lifting means, particularly a three point lifter, the vehicle comprises a power unit with mechanical drive, connected to and driven by said gearbox, the vehicle comprises at least one hydraulic pump driven by a shaft passing through the gearbox and continuously driven upon starting the motor, the power output block with mechanical drive comprises a clutch and a speed reduction box, the driver's cab contains a reversible control station.

The invention will be better understood from the description which follows, given by way of non-limiting example, with reference to the accompanying drawings, in which.

Figure 1:
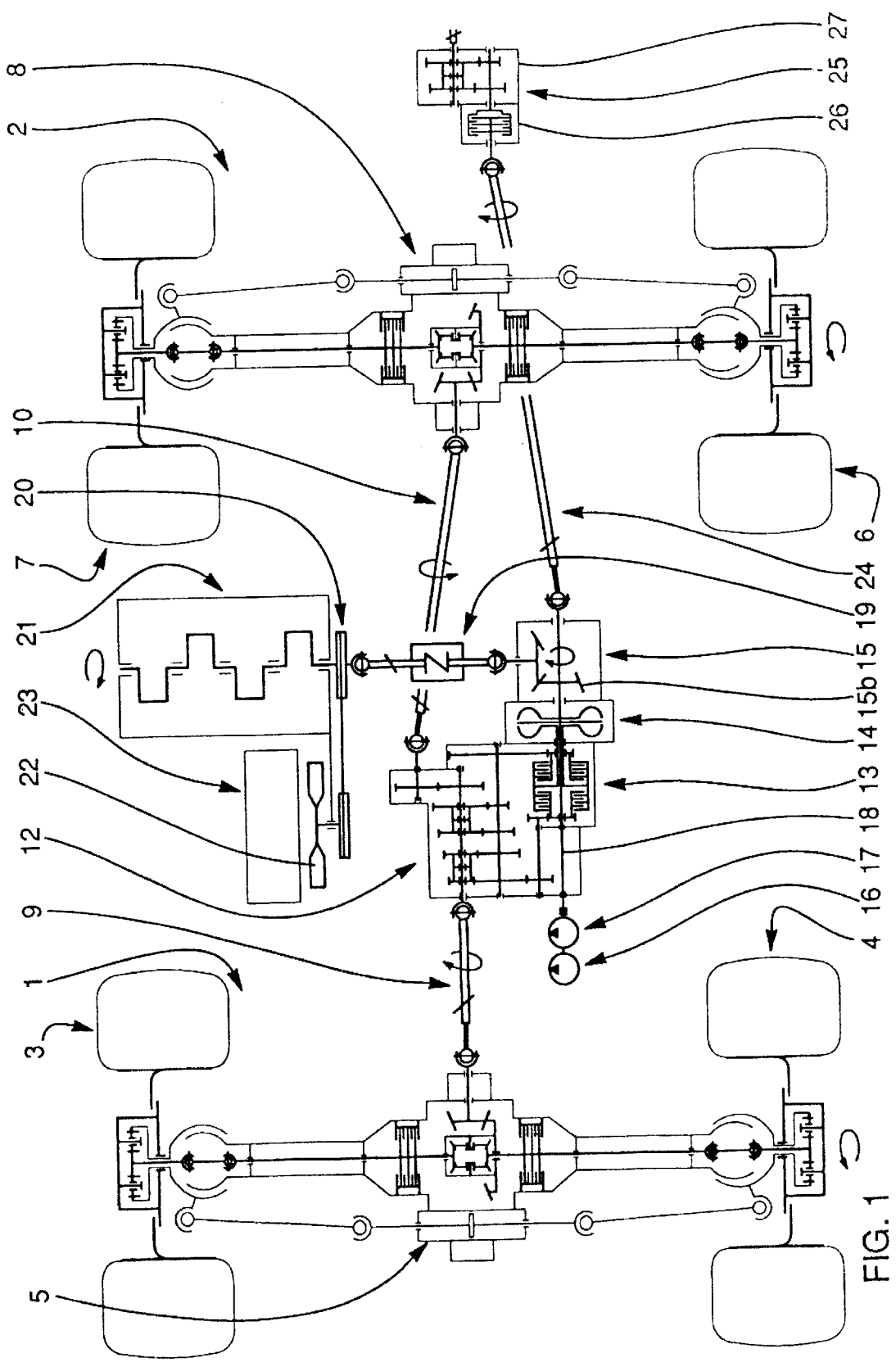
FIG. 1 shows schematically in plan view the kinematic arrangement of a first embodiment of the invention.

Referring to FIG. 1, the first embodiment of a vehicle according to the invention comprises a kinematic arrangement with a front axle 1 and a rear axle 2. The front axle 1 is a self-blocking differential with limited sliding movement, driving two driven and steering front wheels 3 and 4. The control of the front axle is a hydrostatic control with a central double acting jack 5.

The rear axle 2 is a self-blocking differential with limited sliding for driving and steering the two driven and steerable rear wheels 6 and 7. The control of the rear axle is also a hydrostatic control with a central double-acting jack 8.

The drive of the front axle 1 is ensured by means of a cardan shaft 9, whilst the drive of the rear axle 2 is ensured by means of a cardan shaft 10. The cardan shafts 9 and 10 are connected to two corresponding outputs of a gearbox 12 designed such that the cardan shafts 9 and 10 will be driven simultaneously at the same speed when the vehicle is moving and such that the cardan shafts 9 and 10 will be simultaneously stopped when the vehicle is at rest.

The gearbox 12 is connected to an inverter 13 and a converting coupling or clutch 14. The reverser 13, the clutch or converter 14, hydraulic pumps 16 and 17 are driven simultaneously by a shaft 18 fixed in rotation with a pinion 15*b* of an angeled transmission 15. The transmission 15 is connected to the flywheel of the motor by a cardan shaft 19. The flywheel 20 of the heat engine 21, preferably a diesel engine, also carries a drive pulley of the cooling fan 22 for the radiator 23 by means of a belt and pulley transmission.

Preferably, the transmission 15 is a transmission of the throughshaft type having a second drive output of a cardan shaft 24 adapted to drive a power-take-off block 25 comprising a clutch 26 for power output and a power output housing 27 with two ratios having two output shafts respectively for a nominal operation of 540 rpm and for a nominal operation of 1000 rpm.

Figure 2:
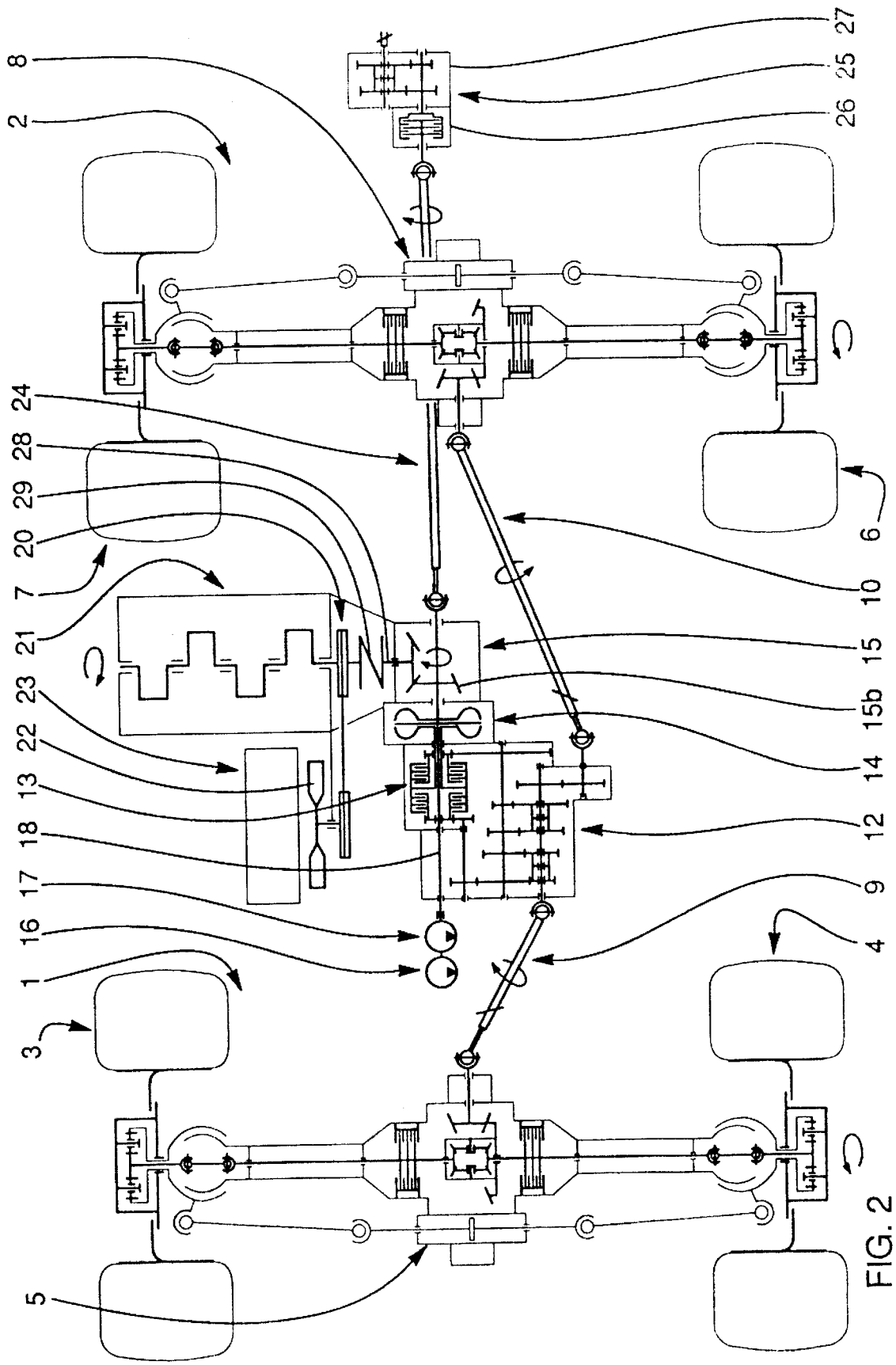
FIG. 2 shows schematically in plan view the kinematic arrangement of a second embodiment of the invention.

With reference to FIG. 2, identical reference numerals to those of FIG. 1 are used to identify identical or functionally equivalent elements.

In this second embodiment, the drive of the transmission 15 from the flywheel 20 of the motor 21 is ensured by means of a shaft 28 substantially coaxial to the axis of the crankshaft of the motor 21. The connection shaft 28 is preferably a shaft having one grooved end coacting with a resilient coupling 29 secured to the flywheel 20 of the internal combustion motor 21.

In the two embodiments of FIGS. 1 and 2, the automotive vehicle with a telescopic load carrying arm comprises a rigid chassis (not shown) carried by the front axle 1 provided with front wheels 3 and 4 and the rear axle 2 provided with rear wheels 6 and 7. The rigid chassis carries externally and laterally, between the front wheel 3 and the rear wheel 7, a motor propulsion group comprising the internal combustion motor 21 as well as the radiator 23 cooled by the fan 22 driven continuously upon starting the motor. The motor 21 is oriented transversely and connected to the transmission 15 so as to drive the latter continuously upon starting the motor 21. The transmission has an output driving an input shaft 18 of the gearbox 12, the shaft 18 also continuously driving upon starting the motor the hydraulic pumps 16 and 17. The gearbox 12 is oriented longitudinally parallel to the longitudinal axis of the vehicle and disposed substantially in a central position of the vehicle.

Figure 3:
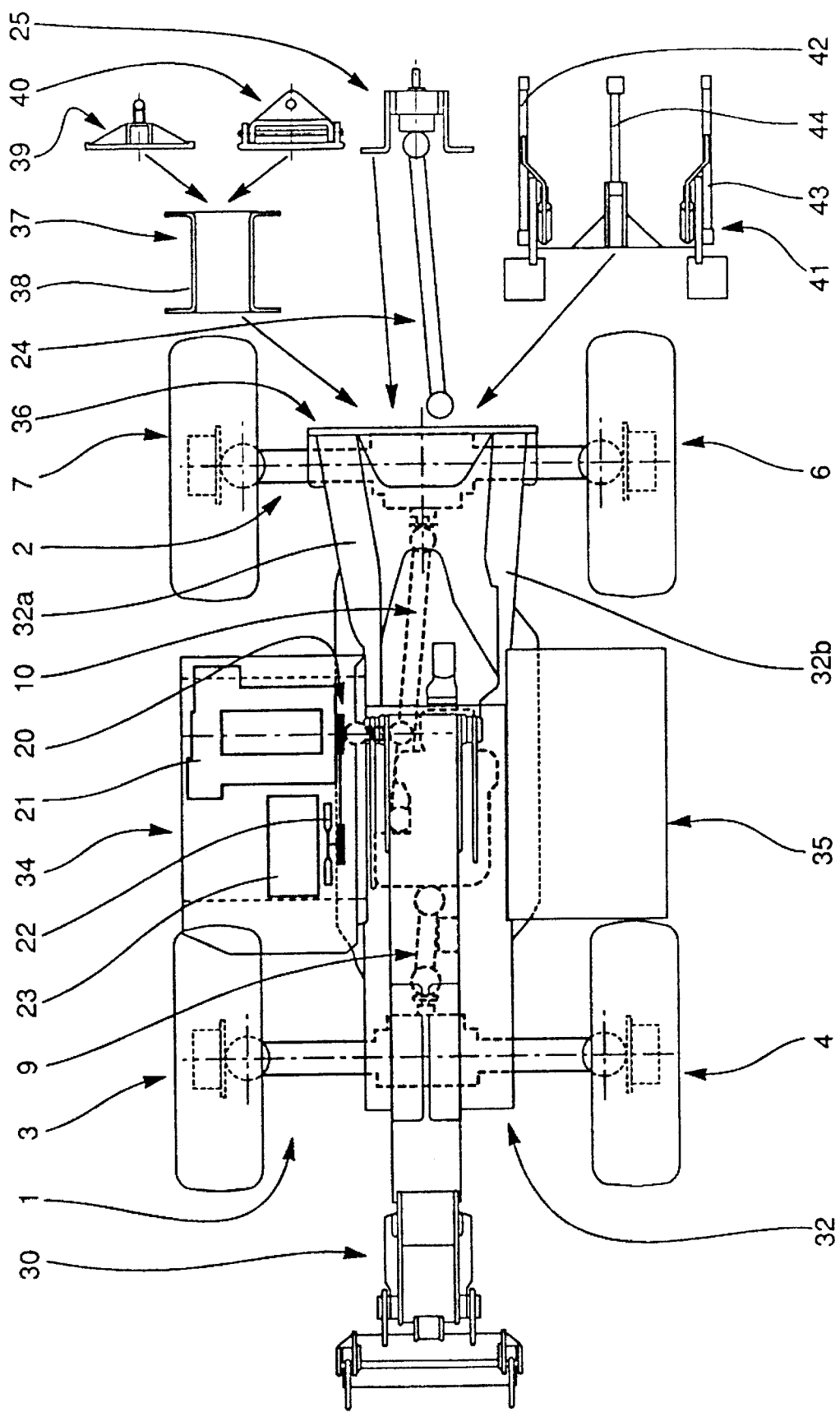
FIG. 3 shows schematically in plan view a modular embodiment of the invention, in which the driver's station is not shown.
Figure 4:
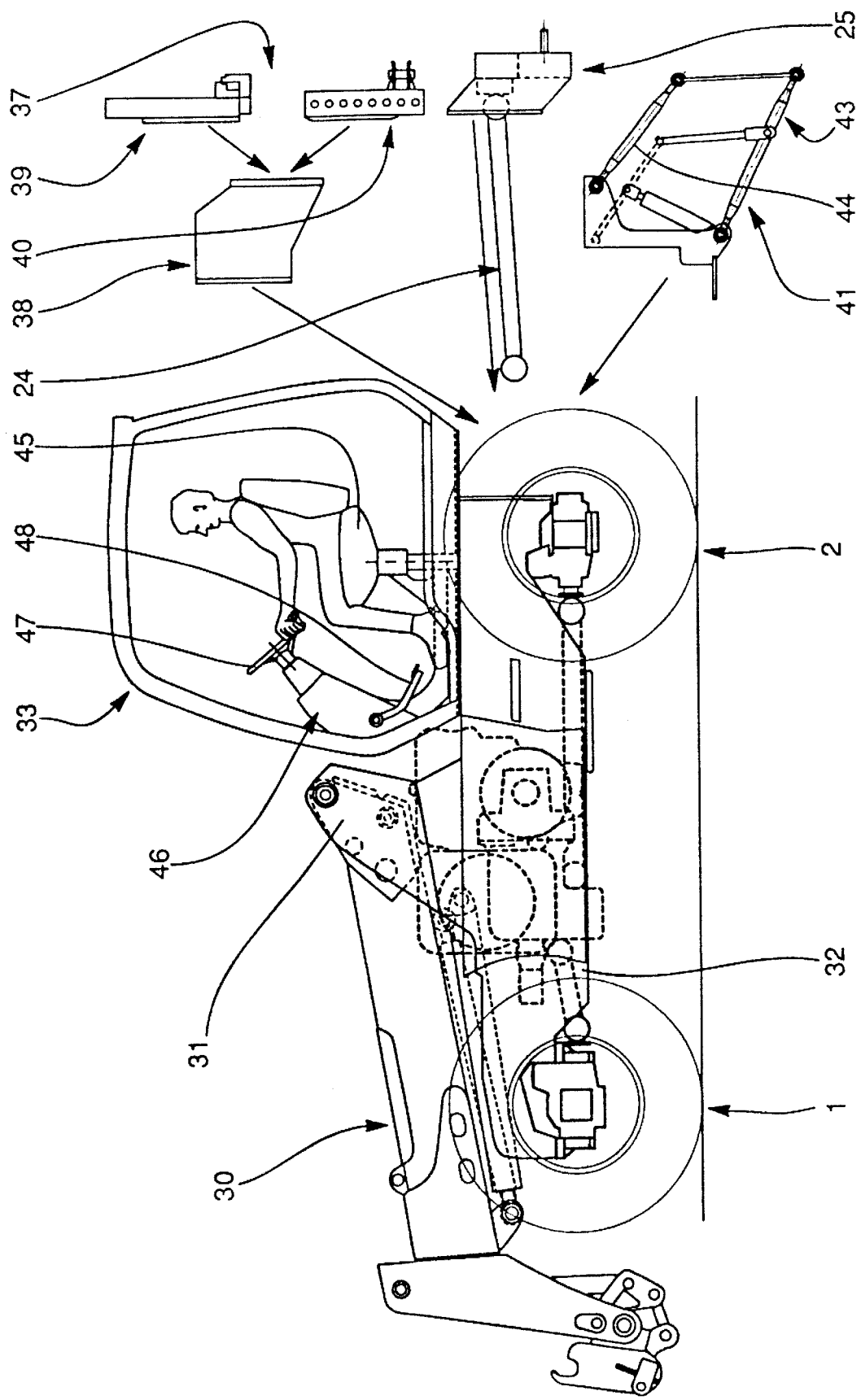
FIG. 4 shows schematically a side elevational view of the vehicle of FIG. 3.

With reference to FIGS. 3 and 4, a vehicle constituting a preferred modification of embodiment of the invention has identical or functionally equivalent elements to the elements of the vehicle of FIG. 1 and designated by the same reference numerals as those of FIG. 1.

The vehicle comprises a telescopic load carrying arm 30 mounted articulately on a support 31 secured to a rigid chassis 32 carried by the front axle 1 and the rear axle 2. The articulation support 31 for the load carrying arm 30 is disposed in front of a cab 33, substantially toward the middle of the distance comprised between the front axle 1 and the rear axle 2. The chassis 32 carries externally and laterally on the one hand a compartment 34 containing the diesel engine 21, the fan 22 and the radiator 23. The compartment 34 of the motor propulsion group is located laterally between the front wheel 1 and the rear wheel 7, fixed externally to the rigid chassis 32. The rigid chassis 32 carries laterally and externally on the side opposite the compartment 34, a compartment 35 containing two reservoirs for onboard fluid (fuel, hydraulic fluid). The structure thus defined permits designing a machine with a short and narrow chassis 32, which ensures good handling in each of the three drive modes: a single drive axle, two drive axles, or sideways displacement.

Preferably, the chassis 32 has on the side opposite the telescopic arm 30, which is to say on the side of the rear axle 2, modular securement means. The modular securement means are preferably comprised by a rear vertical plate 36 secured to the beams 32*a* and 32*b* of the chassis 32. The rear securement plate 36 is preferably pierced to receive mechanical securement means for example by screwing on replaceable or interchangeable components.

A first modular replaceable and interchangeable component is for example a towing block 37 comprising on the one hand a rear extension 38 with two parallel clamps and a towing hook: either a hydraulic hook 39 or a mechanical hook 40 with adjustment in height by means of a scale.

As a second example of a modular component, can be envisaged a power-take-off block 25 associated with a drive shaft 24 with cardans. This power-take-off block 25 with mechanical drive comprises a clutch 26 and a speed reduction housing 27 secured to each other.

As a third type of mechanical modular and interchangeable component, can be envisaged a hydraulic lifting assembly 41 comprising in known manner two lifting arms 42 and 43 and a third point 44.

All these modular components are arranged to be secured by means of mechanical securement to the plate 36. Mounting can be effectuated not only replaceably and interchangeably, but also by combining the assembly of the mentioned modular components, or only certain ones of them, together, for example two by two.

Figure 5:
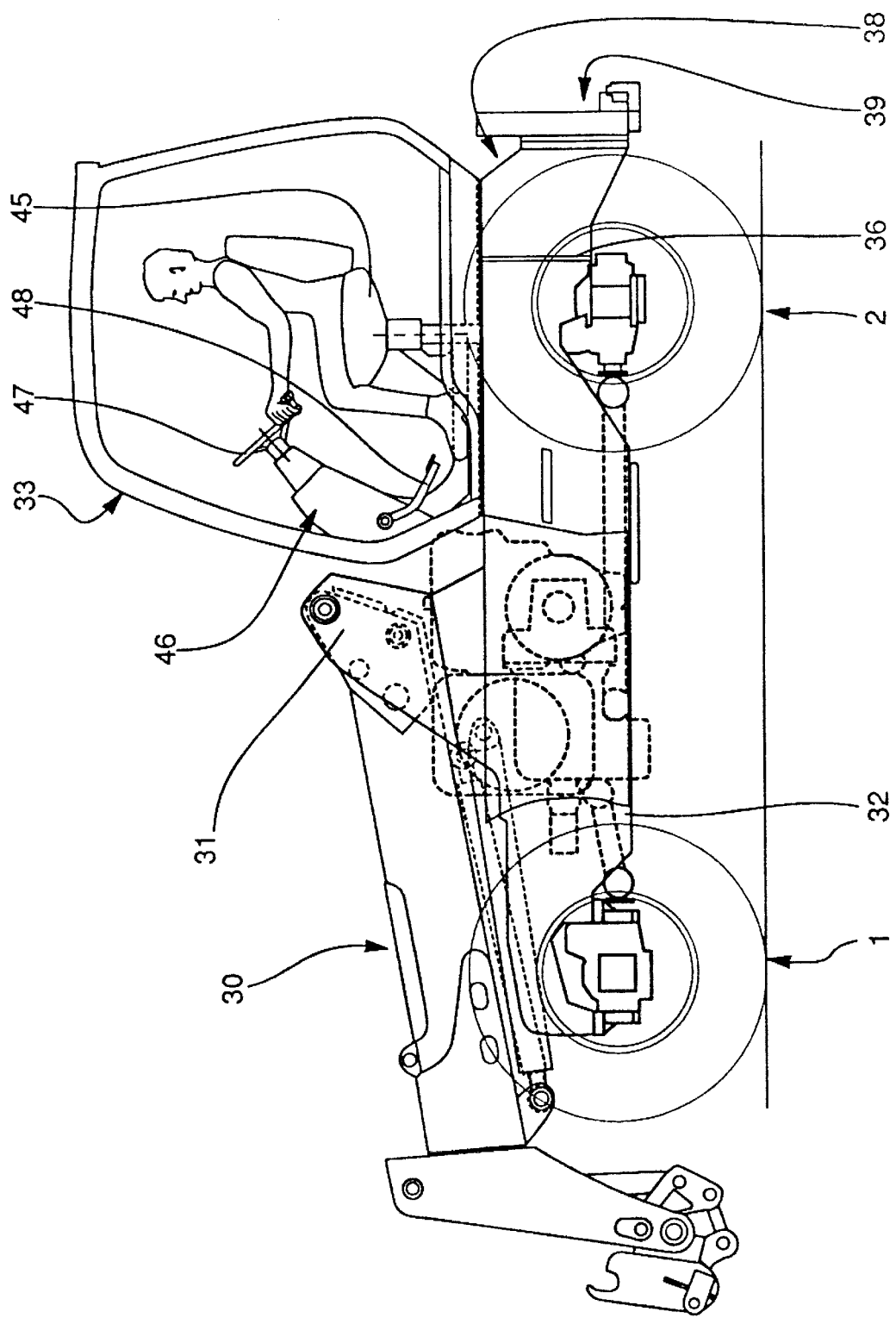
FIGS. 5 to 8 show schematically views in side elevation of modified embodiments of the vehicle of FIGS. 3 and 4.

The vehicle of FIG. 5 thus comprises only a towing means constituted by a hydraulic hook 39 mounted on the extension support 38 secured to the rear of the chassis 32 by means of securement to the plate 36.

Figure 6:
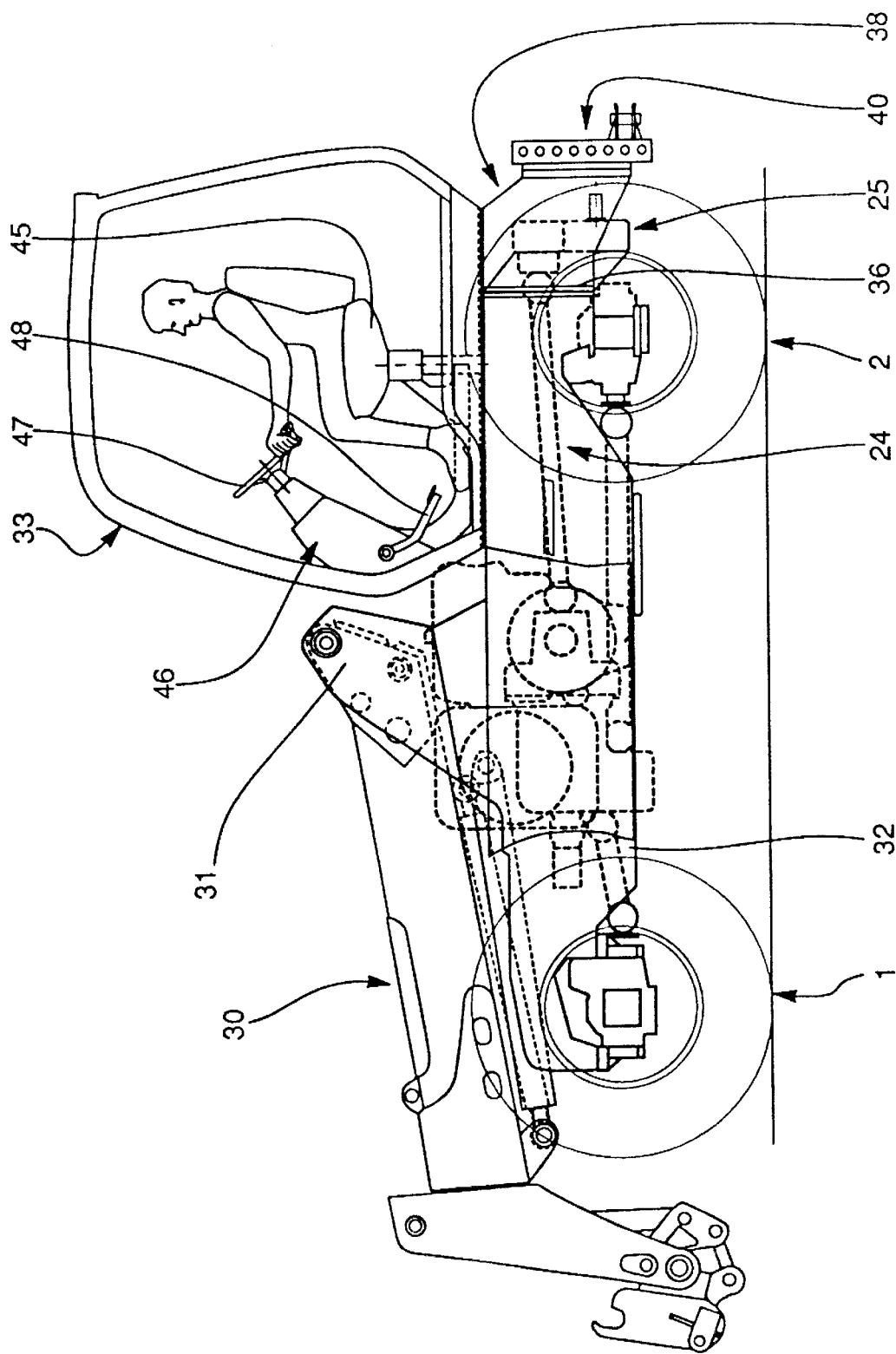

The vehicle of FIG. 6 comprises in combination a power output block 25 driven by means of a cardan shaft 24 and a mechanical hook 40 adjustable in height in the manner of a scale mounted on the support 38 of the rearward extension fixed to the chassis 32 on the rear securement plate 36.

In a desirable modification of the invention, the driver's cab 33 contains a reversible control station. The reversible control station comprises a pivotal assembly supporting the driver's seat, and all the driving and control members.

Figure 7:
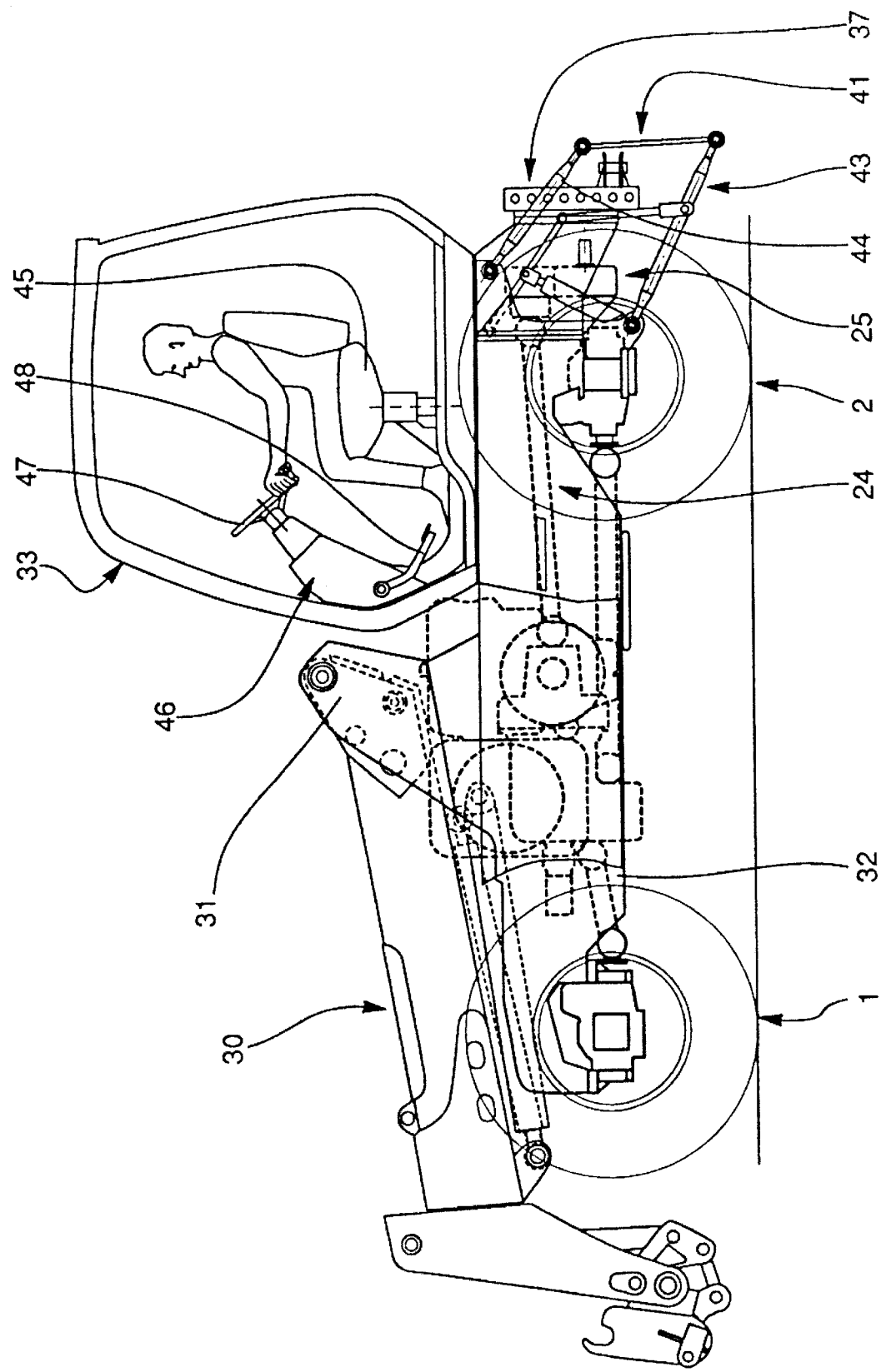

Thus, in FIG. 7, a modification of the vehicle according to the invention comprises a modular assembly combining the lifting means 41 and the power-take-off block 25 driven by the cardan shaft 24. The driver causes the mentioned assembly to pivot rearwardly with the seat 45 and the console 46 comprising steering wheel 47 and accelerator and brake pedals 48 as well as other control levers (not shown), particularly for controlling lifting or clutching.

The advantage of this arrangement is that the driver continuously has a direct view of the working tools secured to the three point lifting 41 and driven by the power-take-off block 25. The operation of the vehicle according to the invention is thus ergonomic and has improved safety.

Figure 8:
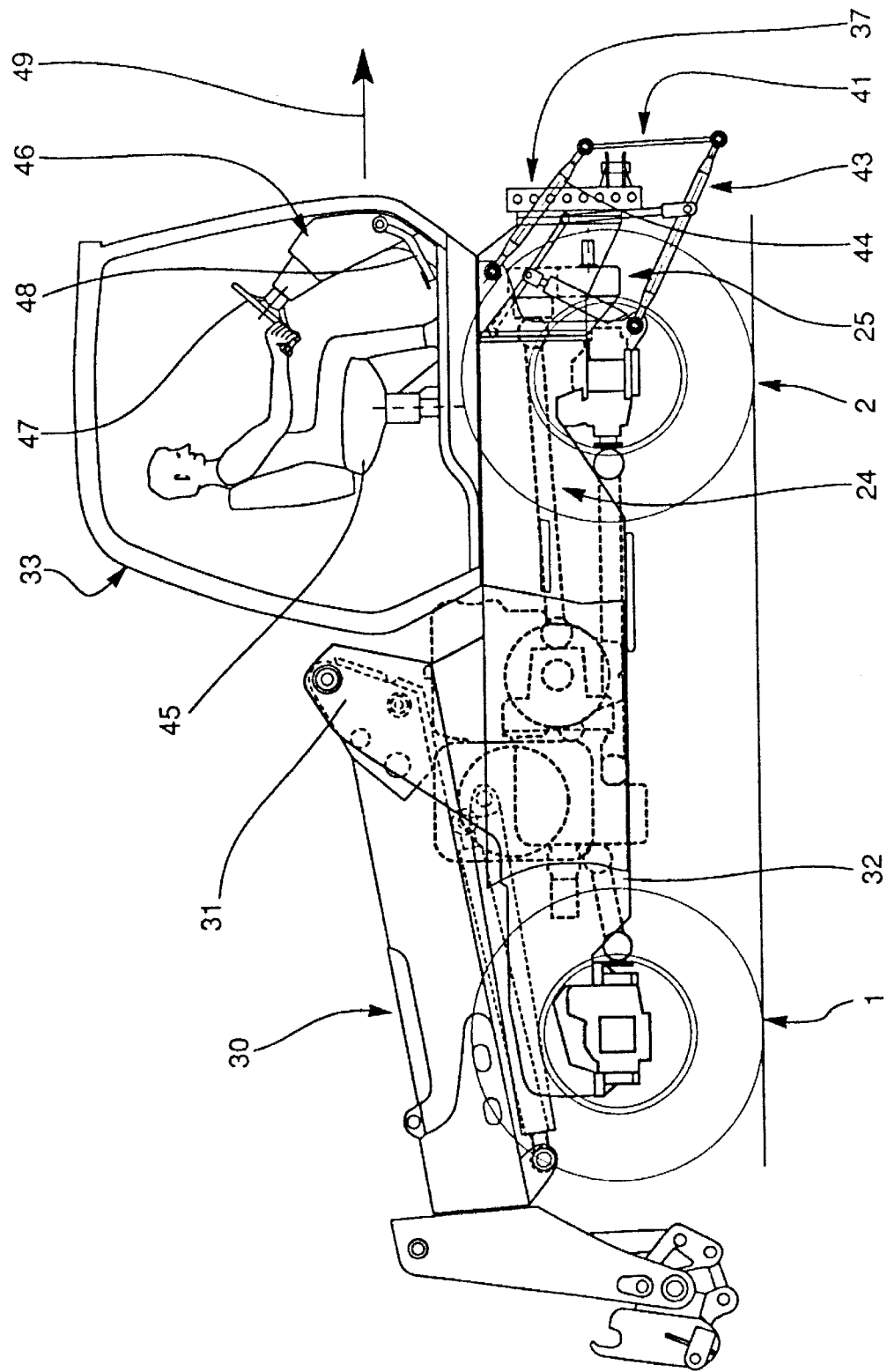

The embodiment of FIG. 8 differs from that of FIG. 7 by the addition of a towing means 37 in combination with lifting means 41 and the power-take-off block 25. In the illustrated position, the driver can easily couple a tool or a tow by manipulation in the direction of the arrow 49. Then, in the course of driving, the operator reverses the reversible drive station to move in the direction opposite the arrow 49; the same is true in the case of manipulation with the aid of the telescopic load carrying arm 30.

The invention described with reference to several embodiments is in no way thereby limited, but covers on the contrary all modification of form and any variation of embodiment within the scope and spirit of the invention: thus, the cab 33 instead of being a covered cab could be replaced by a simple arch, secured or not to the driver's station when the latter is reversible.

What is claimed is:

1. A vehicle with a telescopic load carrying arm (30), comprising a rigid chassis (32) carried by front and rear axles (1 and 2) provided with wheels (3, 4, 6, 7) and a driver's cab (33) mounted on said rigid chassis (32), in which a support (31) for articulation of the telescopic load carrying arm ((30) is disposed in front of the cab (33) and substantially midway between the front and rear axles (1 and 2), the chassis (32) carrying externally and laterally, between one front wheel (3) and one rear wheel (7), a compartment (34) comprising an internal combustion motor (21) for the vehicle and between another front wheel and rear wheel a compartment (35) containing at least one reservoir of onboard fluid, the chassis (32) carries, on the opposite side of the telescopic arm (30), means (36) for detachable securement to a piece of rear equipment, the motor (21) being oriented transversely and connected to an angled transmission (15) having an outlet driving a gearbox (12) oriented longitudinally and disposed substantially in a central position of the vehicle below the support (31) of the telescopic load carrying arm (30), wherein the motor (21) is connected to the transmission (15) by a cardan shaft (19), a power takeoff block (25), and means (24) for directly driving the power takeoff block (25) by the transmission (15).

2. A vehicle as claimed in claim 1, wherein at least one said rear equipment is selected from the group comprising a towing unit (37) and a hydraulic lifting assembly.

3. A vehicle as claimed in claim 1, wherein the vehicle comprises connection means (37) in the form of a towing hook (39, 40).

4. A vehicle as claimed in claim 1, wherein the vehicle comprises means (41) for rearward lifting in the form of a three point lifter.

5. A vehicle as claimed in claim 1, which comprises at least one hydraulic pump (16, 17) driven by a shaft (18) passing through a gearbox (12) and continuously driven upon starting of the motor (21).

6. A vehicle as claimed in claim 1, wherein the power-take-off block (25) with mechanical drive comprises a clutch (26) and a speed reduction housing (27).

7. A vehicle as claimed in claim 1, wherein the driver cab (31) contains a reversible driver station (45–48).

8. A vehicle with a telescopic load carrying arm (30), comprising a rigid chassis (32) carried by front and rear axles (1 and 2) provided with wheels (3, 4, 6, 7) and a driver's cab (33) mounted on said rigid chassis (32), in which a support (31) for articulation of the telescopic load carrying arm (30) is disposed in front of the cab (33) and substantially midway between the front and rear axles (1 and 2), the chassis (32) carrying externally and laterally, between one front wheel (3) and one rear wheel (7), a compartment (34) comprising an internal combustion motor (21) for the vehicle and between another front wheel and rear wheel a compartment (35) containing at least one reservoir of onboard fluid, the chassis (32) carries, on the opposite side of the telescopic arm (30), means (36) for detachable securement to a piece of rear equipment, the motor (21) being oriented transversely and connected to an angled transmission (15) having an outlet driving a gearbox (12) oriented longitudinally and disposed substantially in a central position of the vehicle below the support (31) of the telescopic load carrying arm (30), wherein the motor (21) is connected to the transmission (15) by a connection shaft which is a grooved shaft (28) coacting with a grooved sleeve (29), a power takeoff block (25), and means (24) for directly driving the power takeoff block (25) by the transmission (15).

9. A vehicle as claimed in claim 8, wherein at least one said rear equipment is selected from the group comprising a towing unit (37) and a hydraulic lifting assembly.

10. A vehicle as claimed in claim 8, wherein the vehicle comprises connection means (37) in the form of a towing hook (39, 40).

11. A vehicle as claimed in claim 8, wherein the vehicle comprises means (31) for rearward lifting in the form of a three point lifter.

12. A vehicle with a telescopic load carrying arm (30), comprising a rigid chassis (32) carried by front and rear axles (1 and 2) provided with wheels (3, 4, 6, 7) and a driver's cab (33) mounted on said rigid chassis (32), in which a support (31) for articulation of the telescopic load carrying arm (30) is disposed in front of the cab (33) and substantially midway between the front and rear axles (1 and 2), the chassis (32) carrying externally and laterally, between one front wheel (3) and one rear wheel (7), a compartment (34) comprising an internal combustion motor (21) for the vehicle and between another front wheel and rear wheel a compartment (35) containing at least one reservoir of onboard fluid, the chassis (32) carries, on the opposite side of the telescopic arm (30), means (36) for detachable securement to a piece of rear equipment, the motor (21) being oriented transversely and connected to an angled transmission (15) having an outlet driving a gearbox (12) oriented longitudinally and disposed substantially in a central position of the vehicle below the support (31) of the telescopic load carrying arm (30), wherein the motor (21) is connected to the transmission (15) by a connection shaft which is a grooved shaft (28) coacting with a grooved sleeve (29), a power takeoff block (25), and means (24) for directly driving the power takeoff block (25) by the transmission (15), the vehicle further comprising at least one hydraulic pump (16, 17) driven by a shaft (18) passing through the gearbox (12) and continuously driven upon starting of the motor (21).

13. A vehicle as claimed in claim 8, wherein the driver cab (31) contains a reversible driver station (45–48).

14. A vehicle as claimed in claim 1, wherein said means (24) for directly driving the power takeoff block (25) by the transmission (15) comprises a cardan shaft.

15. A vehicle as claimed in claim 8, wherein said means (24) for directly driving the power takeoff block (25) by the transmission (15) comprises a cardan shaft.

* * * * *